Patented Nov. 18, 1930

1,782,090

UNITED STATES PATENT OFFICE

DUNCAN MacDONALD COPLEY AND JOHN PAUL SNYDER, OF NORWICH, NEW YORK, ASSIGNORS TO THE NORWICH PHARMACAL COMPANY, OF NORWICH, NEW YORK, A CORPORATION OF NEW YORK

MERCURY COMPOUND OF META CRESOL

No Drawing.   Application filed September 14, 1927.   Serial No. 219,558.

The object of our invention is the production of an antiseptic and germicide of marked activity and power as such; and, more particularly, such a germicide containing a mercury compound.

Further objects are the production of such a mercury compound which is usable medicinally and miscible with diluent and ointment vehicles for external and internal application; and which is of low toxicity, highly pentrative, and not objectionably irritating to the membranes, skin and tissues of the body; and which, chemically considered, is of high mercury content, stable, odorless and colorless.

Our composition consists of the reaction products resultant from the mixture of a mercury compound with an isomer or isomers of cresol, and preferably of a mercuric salt with meta cresol, by the process whose steps are next hereinafter set forth.

In preparing our composition, we prefer to use the named ingredients in about the stated proportions, and to cause their chemical combination and reaction by the method recited, since the best results have been secured by use of such materials in the quantities specified and by our process, but this recital is intended merely by way of example illustrative of the invention and is not to be understood as limiting our invention thereto.

In order to exemplify the materials and process:

*Step 1.*—Dissolve 21 grams of potassium hydroxide KOH in 150 cc. of "specially denatured alcohol No. 30," i. e. U. S. Government standard special denatured alcohol No. 30, (whose formula is stated to be 100 gals. ethyl alcohol mixed with 10 gals. methyl alcohol) hereinafter referred to as alcohol No. 30. Filter the solution into 70.5 grams of meta cresol $C_6H_4(CH_3)(OH)$. Rinse the filter with 25 cc. of alcohol No. 30 and add the rinsings to the filtration product.

*Step 2.*—Dissolve 50.55 grams of mercuric chloride, $HgCl_2$ in 300 cc. of alcohol No. 30. Filter the solution, rinsing the filter with 25 cc. of alcohol No. 30 and adding the rinsings to the filtration product.

*Step 3.*—Add the solution resultant from step 2 slowly to the solution resultant from step 1, at room temperature, meanwhile constantly stirring the ingredients. Place the mixture upon a steam bath and allow it to stand on the bath until the precipitate deposited becomes cream white in color and until the mixture has concentrated to a consistency at which it will just flow.

*Step 4.*—Filter off the precipitate when cool and wash it with a mixture of equal parts of alcohol No. 30 and distilled water until the washings show only a very faint trace of chlorides by the silver nitrate test; then cover the precipitate in the filter with alcohol No. 30 of full strength and allow it to drain; and, finally, after drying at a temperature below 100° C., powder the precipitate.

The product as finished consists of 48.8 grams of an odorless, nearly white powder, insoluble in water, alcohol and cold dilute hydrochloric acid or cold dilute nitric acid, but soluble in dilute potassium, or sodium, hydroxide solution.

This product, assayed by the electrolytic method, yields 67.87% metallic mercury.

A solution of the product obtained by dissolving 1 gram of product in 16 cc. of a 10% potassium hydroxide solution and sufficient distilled water to make 500 cc., (i. e. 1 to 500) was colorless and nearly clear, becoming clear on filtration.

So far as the chemical actions involved in the process recited have been determined, the reaction formula of the product is

namely the inner anhydride of hydroxymercuri-meta-cresol, whose graphic formula is:

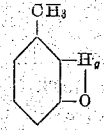

but containing

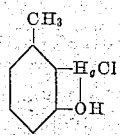

and

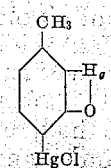

namely, the inner anhydride of hydroxymercuri-meta-cresol $(C_6H_3(CH_3)HgO)$ but containing chloromercuri-meta-cresol $$(C_6H_3(CH_3)(OH)HgCl)$$

and chloromercuri-anhydrohydroxymercuric meta-cresol $(C_6H_2(CH_3)HgO)HgCl)$, the same being entirely free from chlorine and from inorganic chlorides. Meta cresol is chosen by way of preferential illustration because it is believed to have the highest value in bactericidal activity of the three isomeric modifications of cresol.

The cresol specified by the United States Pharmacopœia, 10th edition, is a mixture of the three isomers of cresol, ortho, meta, and para cresol. Since the physical and chemical properties of these isomers are so nearly similar (vide Vol. III of Allen's Commercial Organic Analysis, 5th edition), the process exampled with meta cresol may be followed with the composite isomers with satisfying result as to product, as illustrated by the following exemplification:

Dissolve 14 grams of potassium hydroxide in special denatured alcohol No. 30 and add to 47 grams of cresol (U. S. P.), i. e. a mixture of the three cresol isomers.

Dissolve 33.7 grams of mercuric chloride in alcohol No. 30. Add the solution of mercuric chloride slowly to the cresol solution with continued agitation. A yellow precipitate results which during thirty minutes' digestion upon the steam bath becomes cream white in color. Remove the potassium chloride by washing the precipitate upon a suction filter with a mixture of equal parts of alcohol No. 30 and distilled water. Collect the filtered and washed precipitate and rewash with undiluted alcohol No. 30 with heat for a few minutes, in order to remove the water left by the prior washing. Again drain the precipitate on the suction filter, dry at a low temperature, and powder. The resultant product is a cream white powder, practically odorless, insoluble in water, alcohol and dilute hydrochloric acid, but readily soluble in dilute potassium hydroxide solution. This precipitate represents the reaction product of ortho, meta and para cresol with mercuric chloride, and is believed to be the hydroxymercuri substitution product of the cresol isomers.

A one to one hundred dilution of this product in an ointment base composed of 75% petrolatum and 25% oleostearin shows a very marked antiseptic activity when tested by the Reddish method for determining the antiseptic properties of ointments. Cf. the article by George F. Reddish in the publication entitled "Drug Markets", at page 495 of the issue dated May 31, 1927.

The Reddish method referred to is that devised by Dr. Reddish and used in the Bureau of Chemistry of the U. S. Department of Agriculture, and consists in coating a Petrie dish with 1½% agar, seeding the coating with staphlococci, spotting with the ointment to be observed, and incubating for 48 hours at 37° C.

Under this test, mercuric chloride shows a positive result in dilutions of 1 to 2000 and and a discernible result in dilutions of 1 to 3000. With the product of our Example 1, mercurous salt of meta cresol, the like Reddish test gives a positive result in dilutions of 1 to 150,000, and a discernible result in dilutions of 1 to 200,000.

The products of both Examples 1 and 2 show a bacteriostatic potency twice that of bichloride of mercury $(HgCl_2)$, in equal ratios of dilution at 37° C., upon a strain of microccus aureus, supplied by the Department of Agriculture. In doses of 8 milligrams of our composition, Example No. 1, per kilogram of subject, injected intramuscularly, our product was non-toxic; whereas a like quantity of mercuric chloride $(HgCl_2)$ similarly administered was a lethal dose resulting in the death of the white rats thus treated.

In a weak potassium hydroxide dilution of 1 to 1500, both exampled products are non-irritant to normal skin surfaces, when repeatedly applied to the same area; and innocuous to throat membranes when applied in 1 to 3000 dilution. They are highly penetrative and do not coagulate with albumen as does mercuric chloride under the same conditions of test.

While we have thus described the utilities of the compositions exampled as demonstrated by tests made by us, we also believe that these organic mercury derivatives of meta cresol and of cresol may be indicated with safety and benefit for internal medication.

We therefore claim as new and desire to secure by Letters Patent:

1. The process of producing the organic mercury derivatives of a cresol isomer consisting in filtering into the isomer an alcohol solution of potassium hydroxide, slowly adding thereto an alcohol solution of a mercuric salt, and meanwhile agitating the mixture, then concentrating same and promoting reaction by low heat, cooling, filtering, and washing until only very faint traces of chlorides appear, and finally drying same.

2. The process of producing organic mercury derivatives of meta-cresol consisting in filtering into the isomer an alcohol solution of potassium hydroxide, slowly adding thereto an alcohol solution of mercuric chloride, and meanwhile agitating the mixture, then concentrating same and promoting reaction by low heat, cooling, filtering, and washing until only very faint traces of chlorides appear, and finally drying same.

3. The process of producing a mercury compound with isomers of cresol consisting in filtering into the isomers an alcohol solution of potassium hydroxide, slowly adding thereto an alcohol solution of a soluble mercuric salt, meanwhile agitating the mixture; concentrating same; filtering; and washing with water and with alcohol until only very faint traces of chlorides appear, and finally drying the same.

4. An antiseptic and germicidal composition containing the inner anhydride of hydroxymercuri-meta-cresol and chloromercuri-meta-cresol and chloromercuri-anhydrohydroxy mercuric meta-cresol.

5. An antiseptic and germicidal composition containing the inner anhydride of hydroxymercuri-meta-cresol and chloromercuri-meta-cresol and chloromercuri-anhydrohydroxy mercuric meta-cresol, the same being entirely free from chlorine and from inorganic chlorides.

6. An antiseptic and germicidal composition consisting of the hydromercuri substitution product of a mixture of a plurality of cresol isomers, one of which is meta-cresol, with mercuric chloride, the said product being a cream white powder, substantially odorless, and insoluble in water, alcohol and cold dilute hydrochloric acid or cold dilute nitric acid; but readily soluble in dilute potassium-hydroxide solution or sodium-hydroxide solution; the same being entirely free from chlorine and from inorganic chlorides, and containing about 68 per cent. metallic mercury and having a bacteriostatic potency twice that of bichloride of mercury in equal ratios of dilution.

DUNCAN MacDONALD COPLEY.
JOHN PAUL SNYDER.